United States Patent Office 3,730,910
Patented May 1, 1973

3,730,910
NOVEL ZEOLITE SURFACES
Edwin W. Albers, Annapolis, and Grant C. Edwards, Silver Spring, Md., assignors to W. R. Grace & Co., New York, N.Y.
No Drawing. Filed Feb. 11, 1971, Ser. No. 114,737
Int. Cl. B01j 11/40
U.S. Cl. 252—455 Z         27 Claims

ABSTRACT OF THE DISCLOSURE

Aluminosilicates, and particularly those of the zeolite class, are formed on substrate surfaces. These substrate surfaces include those of fibers, pills, extrusions, pellets or those on bulk structures such as laminates, composites, rods, bricks, tubes, tiles, blocks, honeycomb structures, monoliths and so on. The shape and structure can be of essentially any variation. Suitable substrate surfaces are those of inorganic oxides which include glasses, silicas, aluminas, aluminosilicates, germanias, zirconias, magnesias, titanias, and mixtures and combinations of these materials. The process of forming aluminosilicates on these surfaces comprises either (i), contacting the substrate surface with an aluminosilicate, (ii), contacting the substrate surface with an alkaline sodium silicate-sodium aluminate aluminosilicate or zeolite yielding mixture, or (III), contacting the substrate surface with a silicate or aluminate solution of a composition sufficient to produce a particular aluminosilicate with components on the surface of the substrate. This surface aluminosilicate or zeolite produced can then be ion exchanged or impregnated with any desired elements or chemicals for catalytic or adsorption uses, or otherwise utilized for its novel surface features in composites or other structures.

BACKGROUND OF THE INVENTION

This invention relates to novel aluminosilicate and, in a particular mode, zeolite surfaces. This invention also relates to a method for producing these surfaces on substrates. And in a particular embodiment, this invention relates to new aluminosilicate, and particularly zeolite catalysts and adsorbents.

Aluminosilicates and zeolites are available as naturally occurring and synthetic substances in crystalline or amorphous forms. Aluminosilicates and naturally occurring zeolites have been known and used for some time. The uses include those as ion exchangers for water purification, as catalysts and catalyst carriers and adsorbents. The synthetic crystalline zeolites have been known and used for about a decade. During this period, their mode of synthesis has been improved, and many uses have been found. These uses include petroleum cracking and hydrocracking, as catalysts for industrial processes, adsorbents for water and other materials, and as ion exchange materials. In uses up to the present time, these synthetic zeolites have been used alone as bulk particles pellets, blocks and so on, or embedded in a matrix as part of a composite. Illustrative of bulk uses are those of adsorbing water from natural gas streams and use in dual pane windows and as industrial catalysts. The major uses as composites are in cracking or hydrocracking of petroleum. However, in neither the use as a bulk material nor as part of a composite is the zeolite fully utilized. This is due to the obvious disadvantage that in bulk use a large part of the zeolite consists of interior material which is not available, and in other instances when the zeolite is encapsulated to varying degrees within a matrix material the effective surface is substantially decreased. These materials have a comparatively low surface to weight ratio. The present invention overcomes these and still other disadvantages by providing novel aluminosilicate and particularly zeolite forms, and those in which the aluminosilicate or zeolite is in a condition of high surface to weight ratio. Further, besides producing zeolite materials of high efficiency, these can be produced in essentially any form and in any size. These forms additionally may be rigid or flexible.

The advantages of this invention are the result of the discovery that surfaces of substrates can be converted to or layered with aluminosilicates and zeolites. Uniquely, new aluminosilicate or zeolite surfaces appear to be reactively and attractively attached to the substrate, and not solely mechanically connected as by surrounding or similarly gripping the substrate. This property yields a strong connection of the aluminosilicate or zeolitic surface to the substrate. After producing this high surface area layer in a distinct form, the aluminosilicate or zeolite surface layer may be exchanged with ions of Groups I through VIII of the Periodic Table or otherwise treated depending on the desired subsequent use.

It is therefore an object of this invention to disclose aluminosilicate and zeolitic materials in a varying array of forms and shapes, and having high aluminosilicate or zeolite surface area to weight ratios.

It is also an object of this invention to set out novel methods of producing aluminosilicate and zeolite surfaced materials in a varying array of shapes and forms, and high surface area.

It is additionally an object of this invention to produce aluminosilicate and zeolite adsorbents in novel forms and shapes.

It is also an object of this invention to produce more versatile and effective aluminosilicate and zeolite cracking and hydrocracking catalysts in novel shapes and forms and high surface area.

BRIEF SUMMARY OF THE INVENTION

This invention concerns novel aluminosilicate and zeolitic materials which comprise aluminosilicate or zeolite surfaces on substrates, these surfaces essentially having the same shape and form as the substrate. These aluminosilicate and zeolite materials are reactively and attractively formed on the surface of the substrate from a slurry having either, (i), an aluminosilicate or zeolite yielding mixture having component concentrations effective to produce the desired surface aluminosilicate or zeolite, or (ii), a silicate or aluminate solution of a composition sufficient to produce a particular aluminosilicate or zeolite with components on the surface of the substrate, or (iii), an aluminosilicate or zeolite. Surfaces produced have a high surface area to weight ratio. These shaped aluminosilicate and zeolite materials may then be used as catalysts, adsorbents or so on, or further treated as by ion exchange or impregnation and used as catalysts, adsorbents or so on, or may be used in composites with resins or in other structures.

DETAILED DESCRIPTION OF THE INVENTION

Broadly, this invention comprises reactively and attractively forming shaped aluminosilicate and zeolite surfaces; and particularly synthetically forming aluminosilicate and zeolite surfaces on substrates. This aluminosilicate may be of a crystalline or amorphous type, but is preferably of the zeolite class and particularly a crystalline aluminosilicate zeolite. The aluminosilicate or zeolite is formed on the substrate in a condition of high surface area. The useful zeolites which can be reactively or attractively formed on the substrate include both the naturally occurring aluminosilicates and zeolites, as well as the synthetically produced aluminosilicates and zeolites.

In this application, the term aluminosilicate is set out to be inclusive of both amorphous and crystalline aluminosilicates whether naturally occurring or synthetically formed. This definition, therefore, includes both the crystalline and amorphous zeolites, and those naturally occurring and synthetically formed. For this reason, henceforth in this disclosure for purposes of clarity, the term aluminosilicate will be used to generically describe the class of materials useful in this invention.

Aluminosilicates in the naturally occurring form are found in various clays and minerals. These include the kaolins, zeolite, feldspars, amphiboles and pyroxenes.

In the synthetic form, aluminosilicates have been produced as amorphous compositions in molecular ratios ranging from 50 $SiO_2/Al_2O_3$ to about 1 $SiO_2/Al_2O_3$. Further, aluminosilicates have been produced in combinations with magnesia, titania and rare earth oxides. Aluminosilicates have also been produced in crystalline forms, these being generally designated as zeolites. Generally, the term zeolites is specific to crystalline aluminosilicates, however, in some usage, the Permuttit class of amorphous aluminosilicates are also termed zeolites. Usage herein will treat zeolites specifically as crystalline aluminosilicates, with the noncrystalline Permuttits being included under the broad designation of aluminosilicate.

Zeolites, also known as molecular sieves, are crystalline aluminosilicates having a three-dimensional interconnecting network structure of silica and alumina tetrahedra. The tetrahedra are formed by four oxygen atoms surrounding a silicon or aluminum atom. This structure permits a neat chain arrangement of building tetrahedra. Since oxygen atoms have 2 negative charges while the silicon atoms have 4 positive charges, and the aluminum atoms have 3 positive charges, the trivalency of the alumina causes the alumina-oxygen tetrahedron ($AlO_4$—) to be negatively charged, thus requiring an additional positive charge to balance the system. In the usual synthesized form, this charge is usually supplied by a sodium or potassium cation, most frequently a sodium cation. These charge balancing cations are exchangeable ions and can be exchanged with other cations. Also, up to half the quadravalent silicon atoms in the zeolite crystal structure can be replaced by trivalent alumina atoms. Thus, by regulating the ratios of the starting materials used to prepare the zeolites, it is possible to produce zeolites containing different ratios of silica:alumina having essentially the same crystal structure and as well as zeolites having different structures.

The crystalline zeolites of particular importance are those designated as Types A, X and Y. These have become widely acclaimed for their value as selective adsorbents and catalysts and can readily be reactively and attractively formed as a high surface area layer on a surface. The zeolites designated Type X and Y are specifically referred to as faujasites. These zeolites have a crystalline structure which is made up of the basic sodalite cage building blocks. The sodalite cages are arranged in a tetrahedron relationship (diamond structure) with bridging across the 6 membered hexagonal rings thereby forming a 12 membered oxygen atom ring. These rings provide pore openings of about 9–10 A. in diameter. The overall electrical charge is balanced by a positively charged exchangeable cation. These faujasite zeolites, as well as being very desirable selective adsorbents, are also highly regarded by the art for their catalytic activity, especially with regard to the promotion of reactions used in upgrading petroleum hydrocarbons. The zeolites designated Types X and Y are also referred to by the prior art as Z–14 and Z–14 HS respectively.

The crystalline zeolite designated as Type A, also referred to in the prior art as Z–12, are also constructed of basic sodalite building blocks. The tetrahedra are grouped to form a truncated octahedron with a silica or alumina tetrahedron at each point. This structure is known as a sodalite cage, which in itself contains a small cavity which is of no practical significance since the largest openings are not large enough to permit even the entrance of the smallest molecules. However, when the sodalite cages are stacked in simple cubic forms, as they are in the Type A zeolite, the result is a network of cavities approximately 11.5 A. in diameter, which is accessible through openings on all 6 sides. These openings are surrounded by 8 oxygen ions and are partially blocked by the exchangeable charge balancing in the cation. Thus, by substituting different cations for the balancing cations, zeolites of different pore size openings and therefore selectivity, can be obtained. In the usual synthesized sodium cation Type A zeolite, the oxygen atom rings provide openings of about 4.2 A. in diameter. By exchanging the sodium cation with potassium or by preparing the zeolite with potassium ions, the pore opening will be reduced to 3 A. Similarly, by ion exchanging the sodium ion with divalent cations, the pore opening can be increased, e.g., the calcium form Type A has a pore opening of about 5 A. in diameter) since only half as many calcium as sodium cations will be required to balance the negative charge.

The synthetic zeolites, and the preferred Types A, X and Y (Z–12, Z–14 and Z–14 HS) which can be formed on the surfaces of substrates by the processes of this invention, are set out in Table I.

TABLE I

| Zeolite | Oxide mole ratios (shown as alkali metal oxide form) | Patent disclosures |
|---|---|---|
| X | $1.0\pm0.2Na_2O:Al_2O_3:2.5\pm0.5SiO_2:0\text{-}8H_2O$ | U.S. 2,882,244. |
| Y | $0.9\pm0.2Na_2O:Al_2O_3:3\text{-}6SiO_2:0\text{-}9H_2O$ | U.S. 3,130,007. |
| A | $1.0\pm0.2Na_2O:Al_2O_3:1.85\pm0.5SiO_2:0\text{-}6H_2O$ | U.S. 2,882,243. |
| L | $1.0\pm0.1Na_2O:Al_2O_3:6.4\pm0.5SiO_2:0\text{-}7H_2O$ | Bel. 575,117. |
| D | $0.9\pm0.2[(0\text{-}1)Na_2O:(1\text{-}0)K_2O]:Al_2O:4.5\text{-}4.9SiO_2:0\text{-}7H_2O$ | Can. 611,981. |
| R | $0.9\pm0.2Na_2O:Al_2O_3:2.45\text{-}3.65SiO_2:0.\text{-}7H_2O$ | U.S. 3,030,181. |
| S | $0.9\pm0.2Na_2O:Al_2O_3:4.6\text{-}5.9SiO_2:0\text{-}7H_2O$ | U.S. 3,054,657. |
| T | $1.1\pm0.4[(0.1\text{-}0.8)Na_2O:(0.9\text{-}0.2)K_2O]:Al_2O_3:6.9\pm0.5SiO_2:0\text{-}8H_2O$ | U.S. 2,950,952. |
| Z | $K_2O:Al_2O_3:2SiO_2:0\text{-}3H_2O$ | Can. 614,995. |
| E | $0.9\pm0.1Na_2O:Al_2O_3:1.95\pm1.95\pm0.1SiO_2:0\text{-}4H_2O$ | Can. 636,931. |
| F | $0.95\pm0.15Na_2O:Al_2O_3:2.05\pm0.3SiO_2:0\text{-}3H_2O$ | U.S. 2,996,358. |
| O | $0.95\pm0.05Na_2O:Al_2O_3:.2.2\pm0.05SiO_2:0\text{-}5H_2O$ | U.S. 3,140,252. |
| B | $1.0\pm0.2Na_2O:Al_2O_3:3.5\pm1.5SiO_2:0\text{-}6H_2O$ | U.S. 3,008,803. |
| Q | $0.95\pm0.05Na_2O:Al_2O_3:2.2\pm0.05SiO_2:XH_2O$ | U.S. 2,991,151. |
| M | $1.0\pm0.1K_2O:Al_2O_3:2.0\pm0.1SiO_2:XH_2O$ | U.S. 2,995,423. |
| H | $1.0\pm0.1Na_2O:Al_2O_3:2.0\pm0.1SiO_2:XH_2O$ | U.S. 3,010,789. |
| J | $0.9\pm0.1K_2O:Al_2O_3:2.1\pm0.2SiO_2:XH_2O$ | U.S. 3,011,869. |
| W | $1.0\pm0.1Na_2O:Al_2O_3:4.1\pm0.8SiO_2:YH_2O$ | U.S. 3,012,853. |
| KG | $0.9\text{-}1.1Na_2O:Al_2O_3:2.3\text{-}4.2SiO_2:2.6\text{-}4.6H_2O$ | U.S. 3,056,654. |

The zeolites of particular interest, however, are those designated as Zeolite A, Zeolite X and Zeolite Y.

The naturally occurring zeolites which may be layered onto the substrates of this invention include for example, acadialite, levynite, dachiardite, erionite, faujasite, analcite, paulingite, noselite, ferrierite, heulandite, scolecite, stilbite, clinoptilolite, harmotome, phillipsite, brewsterite, offretite, datolite and alumino-silicates represented as follows:

Chabizite, $Na_2O.Al_2O_3.4SiO_2.6H_2O$
Gmelinite, $Na_2O.Al_2O_3.4SiO_2.6H_2O$
Cancrinite, $3(Na_2O.Al_2O_3.2SiO_2).Na_2CO_3$
Leucite, $K_2O.Al_2O_3.4SiO_2$
Lazurite, $(Na,Ca)_8Al_6Si_6O_24.2(S,Cl,SO_4)$
Scapolite, $Na_4Al_3Si_9O_{24}.Cl$
Mesolite, $Na_2O.Al_2O_3.3SiO_2.2\text{-}3H_2O$
Ptilolite, $Na_2O.Al_2O_3.10SiO_2.4H_2O$
Mordenite, $Na_2O.Al_2O_3.10SiO_2.6H_2O$
Nepheline, $Na_2O.Al_2O_3.2SiO_2$
Natrolite, $Na_2O.Al_2O_3.3SiO_2.2H_2O$
Sodalite, $3(Na_2O.Al_2O_3.2SiO_2).2NaCl$ Erionite and mordenite, which are classically known as naturally occurring zeolites, can also be synthesized and as such can be formed on the substrate by the same techniques used for the conventional synthetic zeolites of Table I.

The useful substrate materials comprise inorganic oxidic materials and mixtures of inorganic oxidic materials. As a non-limiting illustration, these materials include crystalline, amorphous and vitreous silica, silica gels, aluminosilicates, alumina, alumina gels, titania, germania, zirconia, magnesia, gallia, mixtures of these materials, and the glasses, of which Table II sets out some of the most common species.

TABLE II

| Glass code | Type | Forms usually available [1] |
|---|---|---|
| Corning: | | |
| 0010 | Potash-soda-lead | T |
| 0080 | Soda-lime | BMT |
| 0120 | Potash-soda-lead | TM |
| 1720 | Aluminosilicate | BT |
| 1723 | do | BT |
| 1990 | Potash-soda-lead | |
| 2405 | Borosilicate | BPU |
| 2475 | Soda-zinc | T |
| 3320 | Borosilicate | |
| 6720 | Soda-zinc | P |
| 6750 | Soda-barium | BPR |
| 6810 | Soda-zinc | |
| 7040 | Borosilicate | BT |
| 7050 | do | T |
| 7052 | do | BMPT |
| 7056 | do | BTP |
| 7070 | do | BMPT |
| 7250 | do | P |
| 7570 | High lead | |
| 7720 | Borosilicate | BPT |
| 7740 | do | BPSTU |
| 7760 | do | BP |
| 7900 | 96% silica | BPTUMF |
| 7913 | do | BPRSTF |
| 7940 | Fused silica | UF |
| 8160 | Potash-soda-lead | PT |
| 8161 | Potash-lead | PT |
| 8363 | High lead | LC |
| 8871 | Potash-lead | |
| 9010 | Potash-soda-barium | P |
| 9606 | Glass-ceramic | |
| 9700 | Borosilicate | TU |
| 9741 | do | BTU |
| Jena–G–20 | Aluminoborosilicate | BPT |
| Owens-Illinois K51a | do | T |
| Owens-Corning: | | |
| E glass | Lime-aluminoborosilicate | F |
| T glass | Soda-lime aluminoborosilicate | F |
| C glass | Soda-lime borosilicate | F |
| SF glass | Soda-titania-zirconium | F |
| S glass | Magnesium aluminosilicate | F |

[1] B=blown ware; P=pressed ware; S=plate glass; M=sintered slip cast ware (multiform); R=rolled sheet; T=tubing and cane; U=panels; LC= large castings; F=fibers.

The preferred substrate materials are those which are reactive to a degree with highly alkaline solutions, and in a particular embodiment those materials which include a percentage of silicate, silica, alumina, aluminosilicate or all in their composition. These form a particular embodiment, since they have components common to aluminosilicates and are surface etched or otherwise reactive with highly alkaline solutions. These further comprise a class of readily available and comparatively inexpensive materials. This particular embodiment is meant to include the vitreous glasses, quartz, vitreous and amorphous silica, silica gel, alumina, aluminosilicates, mixtures within this grouping and mixtures with other substances outside of this grouping.

The substrates may be of any convenient form or shape. These include fibers, pills, powders, pellets, extrusion or larger bulk structures such as rods, bricks, tubes, tiles, blocks, laminates, composites, honeycombs, monoliths and various combinations of these and other forms and shapes. The forming of these essentially oxide materials can be by any of the conventional techniques. These include melt casting or drawing, reactively forming in a shape, extruding, pressure molding, coating and laminating onto various substrates and so on. These inorganic oxidic materials have been formed into shapes by many other specialty techniques which have been developed for special products. Since the form and shape is not a factor of consequence to operability of the present invention, these are included as within the scope of the present invention.

In producing the articles and materials of the present invention, the exact technique utilized will depend on the substrate composition, and the type of aluminosilicate to be formed on, or coated onto the surface. The synthetic aluminosilicates, can either be synthesized directly onto the surface, or reactively layered onto the surface from a slurry. The naturally occurring aluminosilicates are reactively layered onto the substrate surface from an alkaline slurry of the aluminosilicate, with the exception of erionite and mordenite which may also be synthesized directly on the surface. Using either type of aluminosilicate, the formed layer thickness may range from 0.01 micron to 5 mm. Zeolite layers of from 0.1 to 100 microns, however, are most advantageously formed by direct synthesis on the surface. This is partially the result of the fact that zeolite particles in the range less than about .01 micron are difficult to produce, thus, in reactively coating substrates using zeolitic slurries, the layer thickness will not generally be less than about .01 micron. Thick layers are not difficult to form and may range up to the range of millimeter thicknesses. Either the technique of reactively layering from an aluminosilicate slurry or synthetically forming on the surface, can be used to form the thick surface layered embodiments. Further, in any embodiment of this invention, the aluminosilicate may be on the substrate as a mixture of aluminosilicates.

The different modes of producing these aluminosilicate surfaces will be elaborated on in more detail. In essence, these comprise two modes of synthetically forming the aluminosilicate on the oxidic surfaces, and one mode of reactively layering onto oxidic surfaces. When synthetically forming on the oxidic surface this may be by providing a reaction solution of a silicate or aluminate solution, with the substrate providing all or part of the remaining aluminosilicate components (in-situ formation) or it may be by forming a silicate-aluminate mixture in the presence of the substrate with the aluminosilicate then reactively forming on the substrate surface. By either of these synthetically forming techniques, there is reactively formed a continuum of the substrate and aluminosilicate synthetically formed layer. Obviously, in the embodiment where one of the aluminosilicate components is supplied by the substrate, this substrate must be of a silica, silicate, alumina or aluminosilicate type, or a mixture of these components. Then the remaining component silicate or aluminate, is contacted with the substrate while preferably maintaining the medium alkaline. When both components are present in the reactant mixture, that is, the silicate and aluminate, essentially any substrate may be used. All that is necessary is that the component concentration be adjusted so as to form the desired aluminosilicate on the surface. Layers of any of the synthetic zeolites or of mordenite or erionite, which can also be synthesized, may be formed on the oxidic substrate surfaces utilizing either of the techniques of synthesizing on the surface.

In any of the embodiments where the aluminosilicate is synthesized onto the surface, a zeolite seed solution should be used to effectively form the crystalline aluminosilicate on the surface. The mechanism of action of a seed solution is not fully known, but the results have been well proven. This seed solution has the composition of 8–30 $Na_2O$:0.1–4.0 $Al_2O_3$:5–50 $SiO_2$:50–500 $H_2O$ with the composition of 16 $Na_2O$:1 $Al_2O_3$:15 $SiO_2$:320 $H_2O$ being very useful in promoting the formation of the crystalline aluminosilicates known as zeolites. This seed solution is particularly useful in forming the zeolites designated as A, X and Y, and is desirably used in forming the other synthetic zeolites. The concentration of this seed promoting solution used in the formation of zeolite materials is in the range of 2 to 15 percent. Therefore, in any of the techniques of synthetically forming the crystalline aluminosilicate, that is, either in situ formation where one component is provided by the substrate or in the reactive formation from a silicate-aluminate reaction mixture, the addition of the seed solution to be in a concentration of 2 to 15 percent of the components which form the crystalline surface is necessary. The actual stepwise procedure of synthetically forming these crystalline aluminosilicate layers is well illustrated in the presence of the silicate, aluminate, or silicate-aluminate-reaction along with the seed solution for from 1 to 40 hours or more. The mixture is preferably agitated during at least a part of this period. During this reaction period, the mixture is heated up to reflux temperatures. After heating, the crystalline aluminosilicate layered substrates are removed from the vessel, water washed, and dried. Drying is conventionally by heating at from 110° C. to 600° C. for from .25 to 10 hours.

Layers of any of the naturally occurring or synthetic crystalline aluminosilicate zeolites may be formed on the substrates using the technique of reactively depositing formed strates using the technique of reactively depositing formed zeolite particles onto the substrate surface. This substrate surface may be any of the disclosed oxidic surfaces. In a preferred embodiment of this mode of the invention, the surface should be etched prior to reactively depositing the zeolite onto the surface. This is conveniently accomplished by subjecting the substrate surface to an alkaline wash prior to contact with the zeolite containing slurry. This etched substrate is then contacted with a zeolite slurry and heated at from 90–110° C. for from 2 to 20 hours. During this period, the zeolite layers on the substrate forms a bound continuum on the substrate. The resulting zeolite product is in the same form as the substrate while also presenting the zeolite component in a high surface area condition. A quaternary ammonium silicate may also be added to the slurry mix in order to accelerate the depositing of the zeolite. Other similar inorganic binders may also be used.

This aluminosilicate surface layer, and particularly the crystalline aluminosilicate zeolite layers may be further treated to form adsorbents, industrial catalysts, cracking catalysts or hydrocracking catalysts. A common technique in forming these useful aluminosilicate zeolite products is to exchange the alkali, and particularly sodium ions, with elements of groups II to VIII, and particularly with transition metal, rare earth metal, hydrogen or ammonium ions. Also in regard to zeolite A adsorbents, the soda ($Na_2O$) can be exchanged with potassium or calcium to produce the zeolite A 3 angstrom or zeolite A 5 angstrom molecular sieve. The technique of exchanging the aluminosilicate comprises the contacting, preferably with agitation and heating up to reflux temperatures, of the aluminosilicate surfaced substrate with the solution of exchange ions. The contacting exchange solution is in the range of from .02 to 0.5 molar of the ions which are to be exchanged into the aluminosilicate surface, with the contacting being for a period of from about .1 to 100 hours. After this period of time, the aluminosilicate surfaced material is removed from the exxchange solution, washed and dried. Actually, any known and conventional exchange technique or combination of techniques can be conducted on the surface aluminosilicate. This will essentially depend on the use contemplated for the novel formed aluminosilicate material.

U.S. Pats. 3,374,056, 3,375,065, 3,402,996, 3,449,070, 3,516,786 and 3,518,051 are cited to be exemplary of the various techniques which can be used in removing alkali ions by ion exchanging. Although simple contacting in a single or multiple steps, with or without heating, can be used, the art has developed techniques to decrease the alkali ion content to less than about 0.25 percent. These techniques include more than one contacting step, with one or more calcinations interspersed between the contacting steps. These techniques can be applied to the present zeolite surfaced materials with the only limitation being that calcination temperatures which would distort or destroy the substrate should not be used. This fragility of some substrates, although being a factor, is not significantly limiting since alkali levels of less than 1 percent can be achieved by many different techniques.

The following examples are set out to further illustrate the present invention.

EXAMPLE I

This example sets out a technique of the in situ formation of a type A zeolite layer on the surface of C glass fibers.

20 g. of $Al_2O_3 \cdot 3H_2O$ is dissolved in a solution of 20 g. of sodium hydroxide in 30 g. of water. After complete dissolution of the alumina 195 g. of water is added to bring the sodium aluminate solution to concentration. A zeolite seed solution is formed having a composition of $16Na_2O:1Al_2O_3:15SiO_2:320H_2O$.

50 g. of C Glass glass fibers are blended with 500 ml. of water. The sodium aluminate solution, and 98 ml. of the zeolite seed solution are added to the glass-water mixture with stirring. The formed slurry is heated to 95–105° C. with mixing for 0.1–1 hour. Mixing is then stopped and heating continued for 5 hours. The fibers are then removed, washed and dried. The fibers have a surface area of 326 m.$^2$/g. and an X-ray powder pattern of zeolite A.

EXAMPLE II 50 g. of glass wool is mixed with 500 ml. of water, heated to 9–105° C. with stirring, and then maintained at 95–105° C. for 5 hours. The fibers are removed, washed and dried. These fibers have a surface area of <10 m.$^2$/g. These fibers are a blank for comparison with the zeolite surfaced fibers.

EXAMPLE III

This example illustrates the use of a 5 percent seed solution concentration in the in situ formation of a zeolite A.

16 g. of NaOH is dissolved in 30 g. of water. 19.5 g. of alumina ($Al_2O_3 \cdot 3H_2O$) is added to this solution which is then diluted with 50 ml. of water after the alumina dissolves. To this mixture is added 56 g. of "C" glass fibers slurried with 230 ml. of water along with 42 ml. of a seed solution composed of $$(16Na_2O:1Al_2O_3:15SiO_2:320H_2O)$$

This mixture is heated at 95–105° C. for 12 hours. This material is then filtered on a coarse filter, washed and dried at 105° C. This product has a surface area of 270 m.$^2$/g. and an X-ray powder pattern with broad low peaks of zeolite A.

EXAMPLE IV

The following example sets out a technique for the situ synthesis of faujasite on C Glass fibers.

10 g. of $Al_2O_3 \cdot 3H_2O$ is dissolved in a solution of 49 g. NaOH in 50 ml. $H_2O$. 116 g. C Glass fibers is mixed with 218 g. water and 169 g. sodium silicate of $$3.25SiO_2:1.0Na_2O$$

oxide weight ratio and 1.360 density. The aluminate solution is then mixed with the slurry of glass fiber and sodium silicate followed by the addition of 41 ml. seed solution having the composition $$(16Na_2O:1Al_2O_3:15SiO_2:320H_2O)$$

This slurry is heated to 95–105° C. for 3–5 hours and is then washed and dried. This produces a product which has a 500 m.$^2$/g. surface area and an X-ray powder pattern which shows broad, low peaks identifiable as faujasite.

EXAMPLE V

This example illustrates the layering of a zeolite Y onto a glass fiber substrate surface.

(A) Etching of the glass fiber: 150 g. of "C" glass fiber is mixed with a solution of 50 g. of NaOH dissolved in 3000 ml. of water and boiled for two hours. This fiber is then separated from the caustic solution by filtering, washed, dried and activated. This etched fiber has a surface area of 50 m.$^2$/g. compared to less than 10 m.$^2$/g. for unetched heat activated fiber.

(B) Depositing of the zeolite surface: 50 g. of the above etched "C" glass is slurried with 46 g. of sodium zeolite Y in 1000 ml. of water. 10 ml. of Philadelphia Quartz OSA #1, a quaternary ammonium silicate is added and the slurry mixed for 4 hours. This mixture is then filtered on a coarse filter which allows the excess of sodium zeolite Y to pass through the filter while retaining the glass fiber product which has been layered with the zeolite. This product is then dried and activated at 1000° F. for 1 hour. The surface area is 393 m.²/g.

EXAMPLE VI

Example V is repeated except that the "C" glass is not etched prior to contacting with the sodium zeolite Y slurry. The product is a fiber having a surface area of 52 m.²/g. in comparison to an untreated fiber having less than 10 m.²/g.

EXAMPLE VII

The process of Example V is repeated except that Philadelphia Quartz OAS #1 is not added during the deposition of the zeolite. The product is a fiber having a surface area of 200 m.²/g.

EXAMPLE IX

The process of Example V is repeated except that a cerium exchanged zeolite Y is slurried with the etched glass fibers. The product is a glass fiber having a surface area of 371 m.²/g.

EXAMPLE X

The procedure of Example V is repeated using an "E" glass fiber. The product glass fiber has a surface area of 359 m.²/g.

EXAMPLE XI

This example illustrates the formation of a crystalline zeolite A on the surface of Davison 951 MS silica gel.

140 g. of $\alpha$-alumina trihydrate is dissolved in a solution of 106 g. sodium hydroxide in 160 ml. of water. This solution is then added with stirring to a mixture containing 135 g. of silica gel (90 percent $SiO_2$, 10 percent $H_2O$), 313 g. of sodium silicate solution (24 percent $SiO_2$, mole ratio $3.36SiO_2:1Na_2O$), and 1,950 g. of water. Stirring is continued through this addition and 294 ml. of a seeding mixture composed of

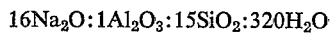
$16Na_2O:1Al_2O_3:15SiO_2:320H_2O$ is added. The resulting slurry is heated at 90–110° C. for 10 hours to produce zeolite A layered silica gel particles. These particles are washed on a filter funnel and dried at 250° C.

EXAMPLE XII

This example illustrates the formation of a sodium zeolite X on the surface of Davison 951 MS silica gel particles.

148 g. of $\alpha$-alumina trihydrate are dissolved in a solution of 200 g. of sodium hydroxide dissolved in 300 ml. of water. This aluminate solution is added with stirring to a mixture containing 203 g. silica gel (90 percent $SiO_2$:10 percent $H_2O$), 564 g. of sodium silicate (24 percent $SiO_2$:mole ratio $3.36SiO_2:1Na_2O$) and 2,434 g. of water. Stirring is continued and 294 ml. of a seeding mixture composed of $16Na_2O:1Al_2O_3:15SiO_2:320H_2O$ is added. This slurry is then heated at 90–110° C. for 7 hours to form a sodium zeolite X layer on the silica gel particles. These layered silica gel particles are then washed on a suction filter funnel and dried in an oven at 450° C.

EXAMPLE XIII

This example illustrates the formation of a sodium zeolite Y on the surface Davison 951 MS silica gel particles.

148 g. of $\alpha$-alumina trihydrate are dissolved in a solution of 323 g. of sodium hydroxide dissolved in 500 ml. of water. This aluminate solution is added with stirring to a mixture containing 540 g. silica gel (90 percent $SiO_2$:10 percent $H_2O$), 1816 g. of sodium silicate (24 percent $SiO_2$:mole ratio $3.36\ SiO_2:1Na_2O$) and 2434 g. of water. Stirring is continued and 294 ml. of a seeding mixture composed of $16Na_2O:1Al_2O_3:15SiO_2:320H_2O$ is added. This slurry is then heated at 90–110° C. for 7 hours to form a sodium zeolite Y layer on the silica gel particles. These layered silica gel particles are then washed on a suction filter funnel and dried in an oven at 450° C.

EXAMPLE XIV

This example illustrates the formation of a crystalline zeolite A layer on an alumina base.

94.5 g. of sodium hydroxide is dissolved in 290 ml. of water and then mixed with 438 g. of a sodium silicate solution (24 percent $SiO_2:3.36SiO_2:Na_2O$ mole ratio). 97 g. of alumina fiber is then added with stirring along with 294 ml. of a seed mixture composed of

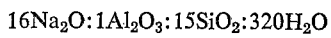
$16Na_2O:1Al_2O_3:15SiO_2:320H_2O$

The resulting slurry is maintained between 90 and 110° C. for 5 hours. An essentially crystalline zeolite A surface forms on the alumina surface. The fibers are washed on a suction filter and dried at 450° C.

EXAMPLE XV

This example illustrates the formation of a crystalline zeolite X layer on an alumina base.

131 g. of sodium hydroxide is dissolved in 290 ml. of water and then mixed with 1315 g. of a sodium silicate solution (24 percent $SiO_2:3.36SiO_2:Na_2O$ mole ratio). 97 g. of alumina fiber is then added with stirring along with 294 ml. of a seed mixture composed of

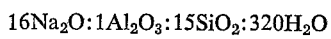
$16Na_2O:1Al_2O_3:15SiO_2:320H_2O$

The resulting slurry is maintained between 90 and 110° C. for 5 hours. An essentially crystalline zeolite X surface forms on the alumina surface. The fibers are washed on a suction filter and dried at 450° C.

EXAMPLE XVI

This example illustrates the formation of a crystalline zeolite Y layer on an alumina base.

133 g. of sodium hydroxide is dissolved in 290 ml. of water and then mixed with 3819 g. of a sodium silicate solution (24 percent $SiO_2:3.36SiO_2:1Na_2O$ mole ratio). 97 g. of alumina fiber is then added with stirring along with 294 ml. of a seed mixture composed of

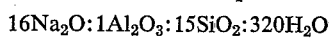
$16Na_2O:1Al_2O_3:15SiO_2:320H_2O$

The resulting slurry is maintained between 90 and 110° C. for 5 hours. An essentially crystalline zeolite Y surface forms on the alumina surface. The fibers are washed on a suction filter and dried at 450° C.

The use of the seed mixture in forming the zeolite on the surface of the silica oxide, aluminum oxide, or aluminosilicate containing substrate provides several unique advantages. The seed mixture by increasing the rate of zeolite formation allows for the formation of a specific zeolite. Also, when the seed mixture is used, cold aging is not a requirement. In normal zeolite X formation, a cold aging of 10 hours is conventional, and for zeolite Y a cold aging of 24 hours is generally used. There are also other benefits, but these are the most significant.

The period of heating in the presence of the seed mixture ranges from 2 to 200 hours, depending on the substrate and the crystalline zeolite to be formed. This is at times designated as a hot aging. The temperature is maintained in the range of 80–120° C., with reflux being the preferred temperature. It is during this hot aging that the zeolite forms in situ on the surface, or layers on the surface, depending on the embodiment being practiced. Washing and drying is by any technique conventional to aluminosilicates and zeolites. This may range in temperature from 110° C. to 600° C. depending on whether there is to be a concurrent activation of the surface. The temperature however should in no instance exceed the stability level of the substrate. The time of such a drying and activation is from .25 to 10 hours. If the zeolite is dried at 110° C., activation is by heating to 400° C.–600° C. for from .25 to 8 hours. Generally before the surface area is measured, the zeolite is activated at about 500° C.–600° C. for about .5 to 2 hours.

What is claimed is:

1. The method for producing zeolite surfaced substrates comprising:
   (a) selecting a substrate consisting of an inorganic oxidic component selected from the group consisting of silicon oxides, aluminum oxides and mixtures thereof;
   (b) contacting said substrate with a solution selected from the group consisting of a silicate solution or an aluminate solution and including a zeolite seed slurry having the composition $8-30Na_2O:0.1-4.0Al_2O_3:5-50SiO_2:50-500H_2O$ the solution component being in a concentration ratio to said substrate inorganic oxidic component to form a zeolite;
   (c) heating this mixture; and
   (d) recovering a zeolite surfaced substrate.

2. The method of claim 1 wherein the alkali ions in said zeolite surface are exchanged with ions selected from the group consisting of rare earth ions, transition metal ions, alkaline earth metal ions, ammonium ions, hydrogen ions and mixtures thereof.

3. The method of claim 1 wherein the zeolite surface formed is a zeolite X surface.

4. The method of claim 1 wherein the zeolite surface formed is a zeolite Y surface.

5. The method of claim 1 wherein the zeolite surface formed is a zeolite A surface.

6. The method of claim 1 wherein said substrate contains at least a silicon oxide, said solution is a sodium aluminate, and said zeolite surface layer is a zeolite X layer.

7. The method of claim 1 wherein said substrate contains at least a silicon oxide, said solution is a sodium aluminate, and said zeolite surface layer is a zeolite Y layer.

8. The method of claim 1 wherein said substrate contains at least a silicon oxide, said solution is a sodium aluminate, and said zeolite surface layer is a zeolite A layer.

9. The method of claim 1 wherein said substrate contains at least an aluminum oxide, said solution is a sodium silicate, and said zeolite surface layer is a zeolite X layer.

10. The method of claim 1 wherein said substrate contains at least an aluminum oxide, said solution is a sodium silicate, and said zeolite surface layer is a zeolite Y layer.

11. The method of claim 1 wherein said substrate contains at least an aluminum oxide, said solution is a sodium silicate, and said zeolite surface layer is a zeolite A layer.

12. The method of claim 1 wherein said substrate is etched prior to the step of contacting.

13. The method of claim 12 wherein said substrate contains at least a silicon oxide and is etched with an alkaline solution.

14. The method of claim 13 wherein the resulting zeolite surface layer is one of the group consisting of Zeolite A, Zeolite X and Zeolite Y.

15. The method for producing zeolite surfaced substrates comprising:
   (a) selecting an inorganic oxide substrate;
   (b) contacting said substrate with an alkali aluminate and alkali silicate solution mixture containing a zeolite seed slurry having the composition 8–30 $Na_2O:0:1–4.0$ $Al_2O_3:5–50$ $SiO_2:50–500$ $H_2O$, the alkali aluminate and alkali silicate being in a concentration ratio to form a zeolite;
   (c) heating this mixture; and
   (d) recovering a zeolite layered substrate.

16. The method of claim 15 wherein the alkali ions in said zeolite are exchanged with ions selected from the group consisting of rare earth ions, transition metal ions, alkaline earth metal ions, ammonium ions, hydrogen ions and mixtures thereof.

17. The method of claim 15 wherein said substrate contains at least one oxide selected from the group consisting of silicon oxide and aluminum oxide.

18. The method of claim 15 wherein said zeolite surface layer is a zeolite X layer.

19. The method of claim 15 wherein said zeolite surface layer is a zeolite Y layer.

20. The method of claim 15 wherein said zeolite surface layer is a zeolite A layer.

21. The method of claim 15 wherein said substrate surface is etched prior to contacting.

22. The method of producing aluminosilicate surfaced silica substrates comprising:
   (a) selecting a shaped silica substrate;
   (b) etching the surface of said silica substrate;
   (c) contacting said etched silica substrate with a slurry of particulate zeolite;
   (d) heating this mixture; and
   (e) recovering a zeolite layered silica substrate.

23. The method of claim 22 wherein the alkali ions in said zeolite surface are exchanged with ions selected from the group consisting of rare earth ions, transition metal ions, alkaline earth metal ions, ammonium ions, hydrogen ions and mixtures thereof.

24. The method of claim 22 wherein said zeolite is one of the group consisting of Zeolite X, Zeolite Y and Zeolite A.

25. The composition which consists essentially of a shaped silica substrate layered with zeolite.

26. The composition of claim 25 wherein said zeolite is one of the group consisting of Zeolite X, Zeolite Y, Zeolite A and mixtures thereof.

27. The composition of claim 25 wherein the shaped silica substrate is a fiber.

References Cited

UNITED STATES PATENTS

| | | | |
|---|---|---|---|
| 3,468,815 | 9/1969 | Cole et al. | 252—455 Z |
| 3,321,272 | 5/1967 | Kerr | 252—455 Z |
| 3,406,124 | 10/1968 | Eastwood et al. | 252—455 Z |
| 3,411,874 | 11/1968 | Ciric | 252—455 Z |
| 3,510,422 | 5/1970 | Cole et al. | 252—455 Z |
| 3,518,206 | 6/1970 | Sowards et al. | 252—455 Z |
| 3,523,092 | 8/1970 | Kearby | 252—455 Z |

CARL F. DEES, Primary Examiner

U.S. Cl. X.R.

423—328